United States Patent [19]

Barney et al.

[11] Patent Number: 4,841,221
[45] Date of Patent: Jun. 20, 1989

[54] POSITION-SENSING CIRCUIT

[75] Inventors: Jonathan A. Barney, Whitehall; Arjuna R. Karunaratne, Allentown, both of Pa.

[73] Assignee: Lutron Electronics Co., Inc., Coopersburg, Pa.

[21] Appl. No.: 186,517

[22] Filed: Apr. 27, 1988

[51] Int. Cl.[4] .......................... G05F 5/02; G01R 27/02
[52] U.S. Cl. ..................................... 323/320; 323/237; 323/300; 315/194; 324/63; 324/65 R
[58] Field of Search ............... 323/237, 239, 242, 299, 323/300, 320, 321, 322, 324, 325, 326, 905; 315/194, 299; 324/63, 65 R; 340/870.38; 338/172, 179, 191, 198, 200, 202

[56] References Cited

U.S. PATENT DOCUMENTS

| | | | |
|---|---|---|---|
| 4,225,808 | 9/1980 | Saraceni | 315/194 X |
| 4,259,619 | 3/1981 | Wall | 315/299 X |
| 4,379,237 | 4/1983 | Mosteller, Jr. | 315/194 X |
| 4,482,844 | 11/1984 | Schweer et al. | 315/194 |
| 4,563,592 | 1/1986 | Yuhasz et al. | 323/905 X |
| 4,567,375 | 1/1986 | Jimerson et al. | 323/905 X |
| 4,568,876 | 2/1986 | Maisch | 324/63 |
| 4,689,547 | 8/1987 | Rowen et al. | 323/905 X |
| 4,693,111 | 9/1987 | Arnold et al. | 338/172 X |
| 4,745,351 | 5/1987 | Rowen et al. | 323/905 X |
| 4,772,824 | 9/1988 | Gulledge | 315/299 X |

OTHER PUBLICATIONS

Lutron Brochure-Nova[R] Fluorescent Dimmers, P/N 362-026 (7/87).
Lutron Brochure-Nova[R] 3-Way System, P/N 360-213 (6/87).

Primary Examiner—Patrick R. Salce
Assistant Examiner—Emanuel Todd Voeltz
Attorney, Agent, or Firm—James Riesenfeld

[57] ABSTRACT

A position-sensing circuit includes an elongated electrically-conductive element divided into two elongated segments. A conductor moves along the element, maintaining electrical contact with at least one of the segments. A first capacitor is connected to the conductor and a second capacitor is connected to one of the segments. When the conductor bridges a gap between the segments, a step-wise change in the time constant of the circuit results. This step-wise change precisely and reproducibly indicates the position of the conductor as being across the gap. The circuit finds particular advantage in a three-way dimming system that permits a remote switch to provide power to a load even if a dimmer that controls the load has been set to provide minimum or no power to the load.

15 Claims, 2 Drawing Sheets

POSITION-SENSING CIRCUIT

DESCRIPTION

1. Field of the Invention

This invention relates to a circuit for sensing the position of a movable conductive element by a stepwise change in the time constant of the circuit.

2. Description of the Related Art

A potentiometer, or variable resistor, is a commonly-used circuit element, the variable resistance providing a convenient means for adjusting some output parameter of the circuit. A typical potentiometer comprises a resistive element and a slider, having at one end a conductive wiper that is in movable electrical contact with the resistive element. As the wiper moves, it continuously varies the resistance measured between the wiper and an end of the resistive element. In principle, there is a direct, unique correspondence between the wiper position and resistance; however, if a particular wiper position must be sensed, a step-wise change in resistance (or other circuit parameter) makes it easier to sense that position.

One way to achieve an abrupt change is by creating a break in the resistive element (by cutting it, for example) to cause an open circuit. A cut linear slide potentiometer was used some years ago to provide a sudden break in resistance in fluorescent light dimmers manufactured by Lutron Electronics Co. Inc. However, there are at least two shortcomings of that approach. First, the resistance depends on details of the contact between the wiper and resistive element near the break in the latter; thus, the relationship between resistance and wiper position is not reproducible. Furthermore, for many purposes, it is desirable to have a closed circuit before, during, and after the abrupt change.

Another way that is known to sense the wiper position of a slide potentiometer involves the use of a microswitch. The microswitch may be positioned at an appropriate point along the wiper's travel and actuated by a cam attached to the slider. However, providing room for the microswitch and the mechanical support that it requires is a problem when space is at a premium. Also, switching does not take place at the same point of wiper travel each time. In any case, the microswitch adds cost to a device that uses it.

SUMMARY OF THE INVENTION

In accordance with the present invention, a bistable position-sensing circuit comprises:

(a) an elongated first electrically-conductive element having first and second segments, (b) a second electrically-conductive element, movable along the length of said first element, while maintaining electrical contact with said first segment, said second segment, or both segments, (c) a first energy-storage element electrically connected to said second element, and (d) a second energy-storage element electrically connected to said first segment and to said first energy-storage element, whereby a time constant of said circuit undergoes a step-wise change when said second element is positioned to contact both segments of said first element.

The circuit permits an accurate and reproducible determination to be made of the point at which the second electrically-conductive element (which may be a wiper of a potentiometer), bridges the gap to contact both segments of the first electrically-conductive element (which may be the resistive element of a potentiometer).

A power-control system of the present invention comprises:

(a) a phase-control dimming system to control electrical power to a load in accordance with a signal provided by a control circuit, which includes a potentiometer positionable for determining the value of said control signal, said potentiometer comprising (i) an elongated resistive element, having first and second segments, and (ii) a wiper that is movable along the length of said resistive element, while maintaining electrical contact with said first segment, said second segment, or both segments;

(b) a first capacitor electrically connected to said wiper and to a second capacitor, said second capacitor being electrically connected to said first segment of said resistive element and to an override resistor, whose resistance is less than the resistance of said second segment, whereby, when said wiper is moved along said second segment to contact both segments of said resistive element, a time constant of said control circuit undergoes a stepwise increase, thereby turning off power to said load; and (c) a first switch means, which (i) if power to said load is on, turns said power off, and (ii) if power to said load is off, turns said power on to a value determined either by said potentiometer position or by the value of said override resistor.

The system permits a remote switch to turn on power to a dimmer-controlled load, even when the dimmer has been adjusted to its power-off position. The system of the present invention eliminates the need for an override switch while providing reliable and reproducible operation.

In the specification and the appended claims, when we refer to an "elongated" conductive element we mean an element having only two dimensions of concern, one of which is substantially longer than the other. The long dimension may be a straight line, in which case it may be the resistive element of a linear slide potentiometer. The long dimension may be an arc of a circle, in which case it may be the resistive element of a rotary potentiometer. Alternatively, the long dimension may have yet a different shape. In any case, at each point along its length, the "direction" of the long dimension is the direction of a tangent to the element at that point.

DETAILED DESCRIPTION OF THE INVENTION

It is often desirable to dim lights in a space from one location and to be able to switch the lights from another "remote" location. In these "three-way dimming" situations, the remote switch turns the lights off—if they were previously on—or turns them on—to the level determined by the dimmer position—if they were previously off. This scheme fails to cope with the situation that is encountered when the lights are turned off by the dimmer. In that case, the remote switch can have no effect on the light level in the space. To avoid this result, it is desirable to be able to override the dimmer setting and provide a convenient lighting level when the dimmer is set for its minimum power to the load. Means for accomplishing this override procedure were disclosed in U.S. Appl. Ser. No. 041,149, filed Apr. 22, 1987, and that application is incorporated herein by reference.

Figure 1:
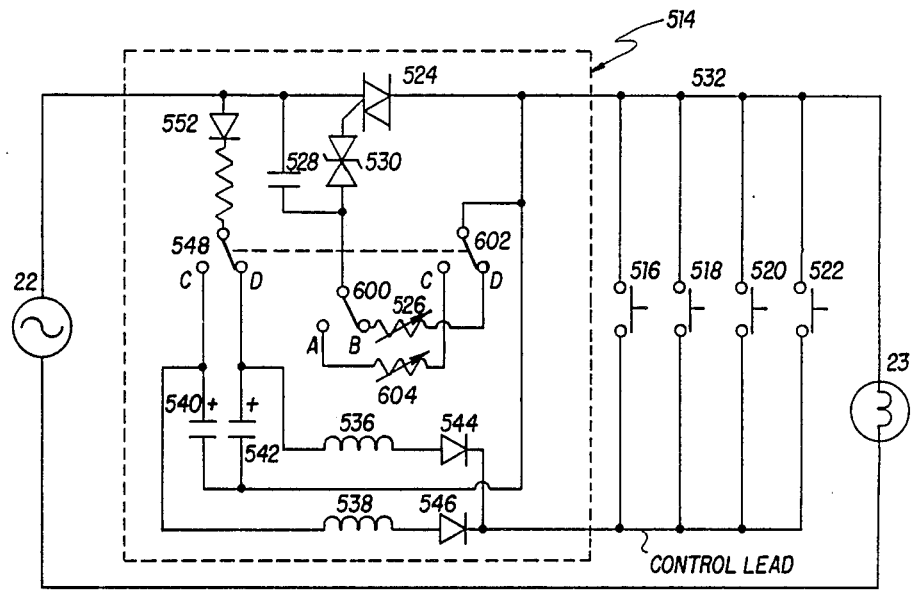
FIG. 1 is a circuit schematic of a prior art system that includes a dimmer and multiple switches.

FIG. 1 depicts a schematic of the circuit disclosed in that application. Load 23 is energized by power supply 22. Dimmer 514 and any desired number of remote switches 516–522 control the power delivered to load 23.

The main dimming device 514 consists of a triac 524, which is fired at a phase angle determined by the adjustment of adjustment potentiometer 526, which is connected in circuit relationship with a capacitor 528 and a conventional firing diac 530. Triac 524 is connected directly in series with power supply 22 and load 23. Other controllably conductive devices such as antiparallel-connected thyristors or power transistors can be used in place of triac 524.

For the phase control circuit to be operative, contact 602 must be in position "D", as shown in FIG. 1. In that case, the right-hand side of adjustable resistor 526 is connected through contact 602 and power lead 532 to the load 23. Contacts 602 and 548, together with set coil 536 and reset coil 538, comprise a latching relay. Coils 536 and 538 operate in conjunction with capacitors 542 and 540, respectively, and diodes 544 and 546, respectively. Contacts 548 and 602 are electrically operated by coils 536 and 538 such that the contacts are in the position shown when coil 538 has been pulsed. The contacts are placed in the opposite position upon the pulsing of set coil 536.

Capacitor 540 or capacitor 542 is charged through diode 552, depending upon the position of relay contact 548. Thus, capacitor 542 is charged when contact 548 is in the position shown and capacitor 540 is charged when contact 548 is operated to its other position.

With the contacts 548 and 602 of the latching relay in the "D" position shown in FIG. 1, the momentary closure of any of contacts 516, 518, 520 or 522 will cause capacitor 542 to discharge through and energize coil 536. This will then cause contact 602 to move to its "C" position in FIG. 1, thus disconnecting adjustment potentiometer 526 from the circuit and turning the power off. Upon the next momentary closure of any of contacts 516 to 522, the reset coil 538 will be energized by the charged capacitor 540, thus causing a reversal of the position of contacts 548 and 602 to the "D" position shown in FIG. 1 and turning on power to the load 23 at an intensity determined by the setting of potentiometer 526.

Override switch 600 permits power to be delivered to load 23 even if potentiometer 526 is adjusted to its off position. While potentiometer 526 is at any setting that provides power to load 23, switch 600 is in the "B" position shown in FIG. 1 and operation of the dimmer-and-switch combination is as described above. However, if potentiometer 526 is moved to its "off" position, not only is power removed from the load, but, in addition, switch 600, which may be a microswitch actuated by a cam attached to the potentiometer slider, is moved to the "A" position. Thereafter, momentary closure of any of contacts 516, 518, 520, or 522 causes capacitor 542 to discharge through and energize coil 536. This, in turn, causes switch 602 to move to position "C", thus permitting supply 22 to energize load 23 at an intensity determined by adjustable resistor 604.

Figure 2:
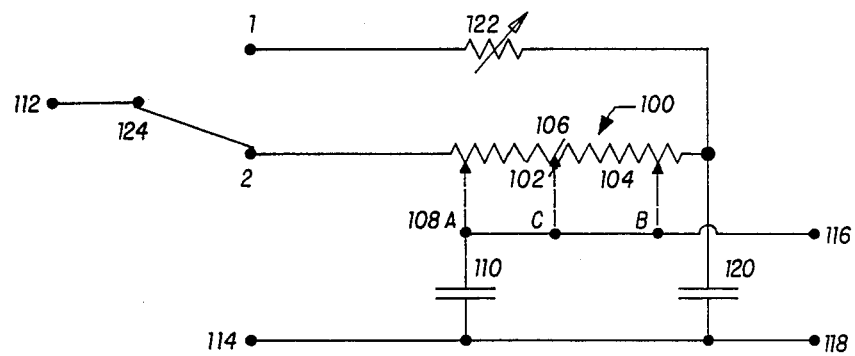
FIG. 2 is a circuit schematic of an embodiment of the present invention.

The present invention eliminates the need for override switch 600. To understand how this is accomplished, we first consider FIG. 2, which is a circuit schematic of the present invention. As shown in FIG. 2, an electrically-conductive element 100 includes segments 102 and 104. Conductor 108 moves along element 100, contacting segment 102 (e.g., position A), segment 104 (e.g., position B), or both segments (position C). Conductor 108 is also electrically connected to energy-storage element 110, which is preferably a capacitor, as shown in FIG. 2. As conductor 108 moves along segment 102, when it reaches position C, bridging segments 102 and 104, energy-storage element (preferably a capacitor) 120 is introduced into the circuit. As a result, the circuit time constant and, hence, the time it would take to charge capacitor 110, increase sharply. The magnitude of the stepwise increase in time constant depends, of course, on the capacitance of capacitor 120. While a large step and correspondingly large value of capacitance is often desirable, other factors, as described below, may militate against a large capacitance. Optional resistor 122, which is preferably variable, has resistance less than the resistance of segment 102. Contacts 1 and 2 of optional switch 124 provide alternate modes of circuit operation.

Figure 3A:
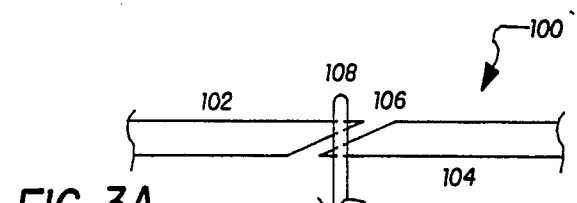
FIGS. 3A and 3B depict alternative embodiments of a segmented electrically-conductive element of the present invention.
Figure 3B:
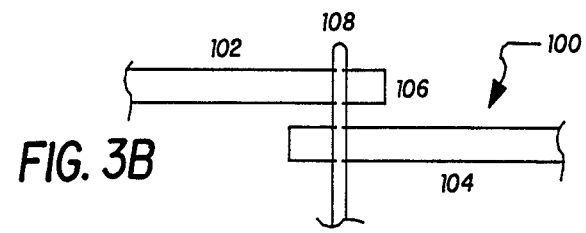

FIG. 2 shows schematically the separation 106 between segments 102 and 104 of electrically-conductive element 100 and shows conductor 108 bridging the separation. Segments 102 and 104, and their separation 106, can take a variety of forms. Two of these are depicted in FIGS. 3A and 3B. In FIG. 3A, the segments are arranged end-to-end and separated by a narrow gap. When conductor 108 has a simple shape, contacting element 100 along a line normal to the long dimension of element 100, then the gap 106 in element 100 preferably makes an acute angle with that long dimension, as shown in FIG. 3A. More preferably, the acute angle is in the range between about 20° and about 45°. The advantage of having the gap at an angle to the long dimension of element 100 is that it helps ensure that conductor 108 contacts either one segment or both, but never contacts neither segment. A mechanical device could serve to insure that conductor 108 avoids a situation in which it contacts neither segment; however, that requires careful alignment of the mechanical device and the gap, so the electronic method described above is preferred. A laser provides a convenient tool for precisely cutting a narrow gap in a potentiometer track, like 106 in FIG. 3A. Alternatively, the gap may be introduced during a silkscreening manufacturing process.

FIG. 3B depicts an alternative embodiment in which the segments are separated along a direction that is normal to their long dimension.

Figure 4:
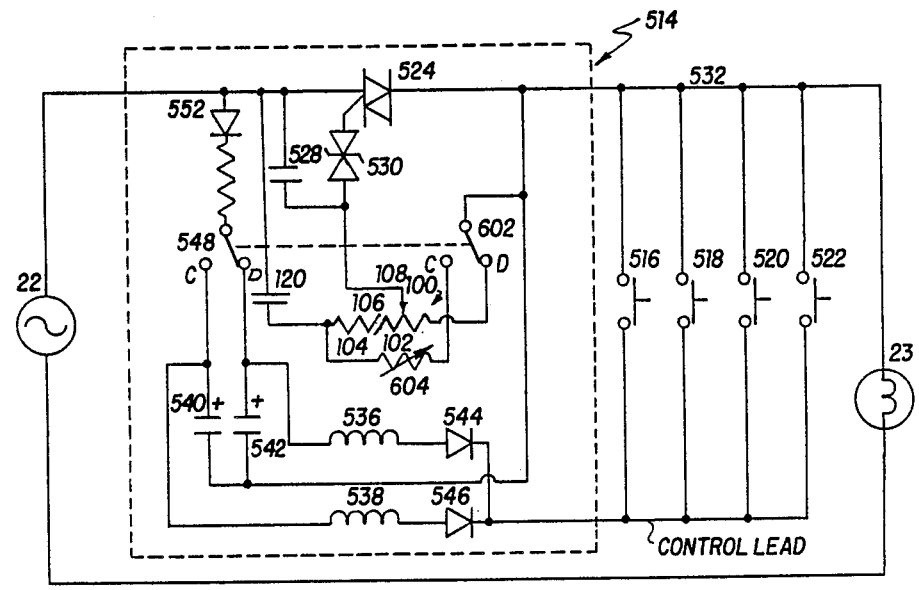
FIG. 4 is a schematic of a dimming circuit of the present invention.

FIG. 4 depicts a schematic of a phase-control dimming system that includes the elements of the circuit of FIG. 2. Note that capacitor 110, override resistor 122, and switch 124 have been renumbered as 528, 604, and 602, respectively, the numbers that the corresponding elements had in FIG. 1. Similarly, contacts 1 and 2 of FIG. 2 have been designated C and D, respectively.

Dimmer 514 can be of the type that automatically takes control of power to the load when its actuator is moved (as described in U.S. Pat. No. 4,689,547, issued Aug. 25, 1987, to Rowen et al.) Alternatively, dimmer 514 can have toggle switch 516 mounted on the face plate beside the dimmer actuator, or toggle switch 516 can be remotely located. The dimming system includes switch 516, and, optionally, additional switches 518, 520, and 522. Preferably, these switches are momentary contact switches. Preferably, override resistor 604 is variable, so that the power level provided in the override mode can be adjusted. The dimming system of FIG. 4 is particularly well adapted for light dimming, but it can also be used for motors and other acpowered systems.

With relay contacts 548 and 602 in the D position, as shown in FIG. 4, the power to load 23 depends on the position of wiper 108 along segment 102. Repeatedly activating a toggle switch, like 516, would cycle the power to the load between the value corresponding to that wiper position and "off". Specifically, when wiper 108 is adjusted for a minimum value of resistance, then capacitor 528 rapidly charges to the voltage required for breakover of diac 530, triac 524 turns on early in each half cycle, and maximum power is provided to load 23. As wiper 108 is moved along segment 102 toward gap 106, the resistance in the circuit increases, consequently the time constant increases, the triac turns on later in each half cycle, and power to the load is reduced. When wiper 108 is moved until it reaches gap 106, the wiper contacts both segments 102 and 104, the capacitance of capacitor 120 is added to the circuit, and the time constant of the circuit rises sharply. As a result, the time to charge capacitor 528 to the voltage required for diac breakover exceeds a half cycle and power to the load goes off.

With wiper 108 in contact with segment 104 (or with both segments 104 and 102), operation of a toggle switch, such as 516, drives the contacts of switches 548 and 602 to position C, where power to the load is turned on to a value controlled by the value of override resistor 604. For the power to go on, the time constant must be smaller than it was with contact 602 in position D. Since capacitors 528 and 120 may both be in the circuit at that point, a smaller time constant requires that resistor 604, which preferably is adjustable, have a smaller resistance than that of segment 102. If the capacitance of capacitor 120 is made very large, then override resistor 604 must be very small. Consequently, that capacitance value is selected as a compromise—large enough to cause a large time constant step when wiper 108 bridges gap 106, but not so large as to require override resistor 604 to be inconveniently small. Typically, the gap in element 100 is at one end; i.e., the resistance of segment 102 is much greater than that of segment 104.

Since certain changes may be made in the circuit and dimming system described above, without departing from the scope of the inventions involved, it is intended that all matter contained in the description or shown in the accompanying drawings shall be interpreted in an illustrative and not in a limiting sense.

We claim:
1. A bistable position-sensing circuit comprising:
 (a) an elongated first electrically-conductive element having first and second segments,
 (b) a second electrically-conductive element, movable along the length of said first element, while maintaining electrical contact with said first segment, said second segment, or both segments,
 (c) a first energy-storage element electrically connected to said second element, and
 (d) a second energy-storage element electrically connected to said first segment and to said first energy-storage element,
 whereby a time constant of said circuit undergoes a step-wise change when said second element is positioned to contact both segments of said first element.

2. The circuit of claim 1 in which said first electrically-conductive element is a resistive element of a slide potentiometer.

3. The circuit of claim 2 in which said second electrically-conductive element is a wiper of the slide potentiometer.

4. The circuit of claim 1 in which said first and second segments are arranged end-to-end and separated by a narrow gap.

5. The circuit of claim 4 in which said gap has a generally rectangular shape and its long dimension makes an acute angle with the long dimension of said first element.

6. The circuit of claim 5 in which the long dimension of said gap makes an angle in the range between about 20° and about 45° with the long dimension of said first element.

7. The circuit of claim 1 in which said first and second segments are elongated and, over at least a part of their length, are separated along a direction substantially normal to their long direction.

8. The circuit of claim 1 in which said first and second energy-storage elements are capacitors.

9. The circuit of claim 8, further comprising a third electrically-conductive element electrically connected to said first segment and said second capacitor.

10. The circuit of claim 9, further comprising a switch means that contacts either said second segment or said third electrically-conductive element.

11. A system for controlling electrical power to a load comprising, in combination:
 (a) a phase-control dimming system to control power to said load in accordance with a signal provided by a control circuit, which includes a potentiometer positionable for determining the value of said control signal, said potentiometer comprising
  (i) an elongated resistive element, having first and second segments, and
  (ii) a wiper that is movable along the length of said resistive element, while maintaining electrical contact with said first segment, said second segment, or both segments;
 (b) a first capacitor electrically connected to said wiper and to a second capacitor, said second capacitor being electrically connected to said first segment of said resistive element and to an override resistor, whose resistance is less than the resistance of said second segment,
 whereby, when said wiper is moved along said second segment to contact both segments of said resistive element, a time constant of said control circuit undergoes a step-wise increase, thereby turning off power to said load; and (c) a first switch means, which
 (i) if power to said load is on, turns said power off, and
 (ii) if power to said load is off, turns said power on to a value determined either by said potentiometer position or by the value of said override resistor.

12. The system of claim 11 in which said first switch means is a momentary contact switch.

13. The system of claim 11 further comprising at least one additional switch means to alternatively perform the functions of said first switch means.

14. The system of claim 11 in which said override resistor is variable.

15. The system of claim 11 in which said load is a lighting load.

* * * * *